(12) United States Patent
Shahinpoor

(10) Patent No.: US 11,874,293 B1
(45) Date of Patent: Jan. 16, 2024

(54) 3-D DEFORMATION AND MOTION SENSORS MADE WITH IONIC POLYMER METAL COMPOSITES

(71) Applicant: Mohsen Shahinpoor, Kansas City, MO (US)

(72) Inventor: Mohsen Shahinpoor, Kansas City, MO (US)

(*) Notice: Subject to any disclaimer, the term of this patent is extended or adjusted under 35 U.S.C. 154(b) by 0 days.

(21) Appl. No.: 18/179,515

(22) Filed: Mar. 7, 2023

(51) Int. Cl.
*G01P 15/08* (2006.01)
*G01P 15/18* (2013.01)
*G01P 15/09* (2006.01)

(52) U.S. Cl.
CPC ...... *G01P 15/0802* (2013.01); *G01P 15/0922* (2013.01); *G01P 15/18* (2013.01)

(58) Field of Classification Search
CPC .. G01P 15/0802; G01P 15/0922; G01P 15/18; B25J 9/1095; B25J 9/1075; B25J 15/02; B25J 18/06; A61F 2/08
See application file for complete search history.

(56) References Cited

U.S. PATENT DOCUMENTS

| | | | | |
|---|---|---|---|---|
| 5,164,053 A | * | 11/1992 | Razaq | G01N 27/4073 204/431 |
| 5,554,272 A | * | 9/1996 | Benco | G01N 27/333 205/792 |
| 6,109,852 A | * | 8/2000 | Shahinpoor | B25J 9/1095 623/64 |
| 2002/0039620 A1 | * | 4/2002 | Shahinpoor | B25J 15/02 427/2.12 |
| 2012/0211261 A1 | * | 8/2012 | Aabloo | F03G 7/00 174/126.1 |
| 2013/0199281 A1 | * | 8/2013 | Zhu | G01M 15/02 73/114.42 |
| 2017/0356815 A1 | * | 12/2017 | Madden | A61B 5/0205 |
| 2018/0038745 A1 | * | 2/2018 | Madden | G01L 11/00 |
| 2023/0021804 A1 | * | 1/2023 | Yu | A61B 5/259 |

FOREIGN PATENT DOCUMENTS

JP 2010-229881 * 10/2010

OTHER PUBLICATIONS

English Translation of JP 2010-229881.*

* cited by examiner

*Primary Examiner* — Helen C Kwok
(74) *Attorney, Agent, or Firm* — V Gerald Grafe

(57) ABSTRACT

The design invention comprises a geometric configuration of an ionic polymer metal composite (IPMC) three dimensional deformation and dynamics sensor capable of sensing any complex deformation, twisting rolling and acceleration measurements by using plated electrodes.

2 Claims, 5 Drawing Sheets

3-D DEFORMATION AND MOTION SENSORS MADE WITH IONIC POLYMER METAL COMPOSITES

TECHNICAL FIELD

The present invention relates to the field of deformation and motion sensors, and more specifically to deformation and motion sensors capable of sensing in three dimensions.

BACKGROUND

3-D actuation and sensing by ionic polymer metal composites (IPMCs) are known in the literature. References that can facilitate understanding of the context of the invention, and the invention, include U.S. Pat. No. 6,109,852, Soft Actuators and Artificial Muscles, Shahinpoor and Mojarrad; U.S. Pat. No. 6,475,639, Ionic Polymer Sensors and Actuators, Shahinpoor and Mojarrad; U.S. Pat. No. 7,276, 090, Method of Fabricating a Dry Electro-Active Polymeric Synthetic Muscle, Shahinpoor and Kim; U.S. Pat. No. 10,881,418-B2_Electrically Controllable Surgical Tool, Shahinpoor and Ecker; each of which is incorporated herein by reference. Such sensors are self-powered materials (IPMCs) that convert any motion (bending, twisting, rolling, waving, etc.) to corresponding output voltage and current signals that be measured, as illustrated in FIG. 1.

Application are numerous for many industrial and biomedical cases. They can be used as a soft biomimetic opening and closing valve in human body for circulation and drainage purposes. They can be used as artificial heart valves or bending microcatheters for surgical applications. They can be used in robotic surgery to create tactile feedback and sensing for the surgeons. They can used to manipulate and rearrange delicate parts in manufacturing of delicate or breakable items and many more industrial and biomedical applications.

SUMMARY OF THE INVENTION

The present invention comprises a geometric configuration of an ionic polymer metal composite (IPMC) three dimensional deformation and dynamics sensor capable of sensing any complex deformation, twisting rolling and acceleration measurements by using plated electrodes. Embodiments of the invention provide configurations of an ionic polymer metal composite (IPMC) three dimensional deformation and dynamics sensor capable of sensing any complex deformation, twisting , rolling, bending, 3-D undulating and acceleration measurements by using ionic polymer metal campsites (also known as IPMCs).

DETAILED DESCRIPTION OF THE INVENTION

Figure 1:
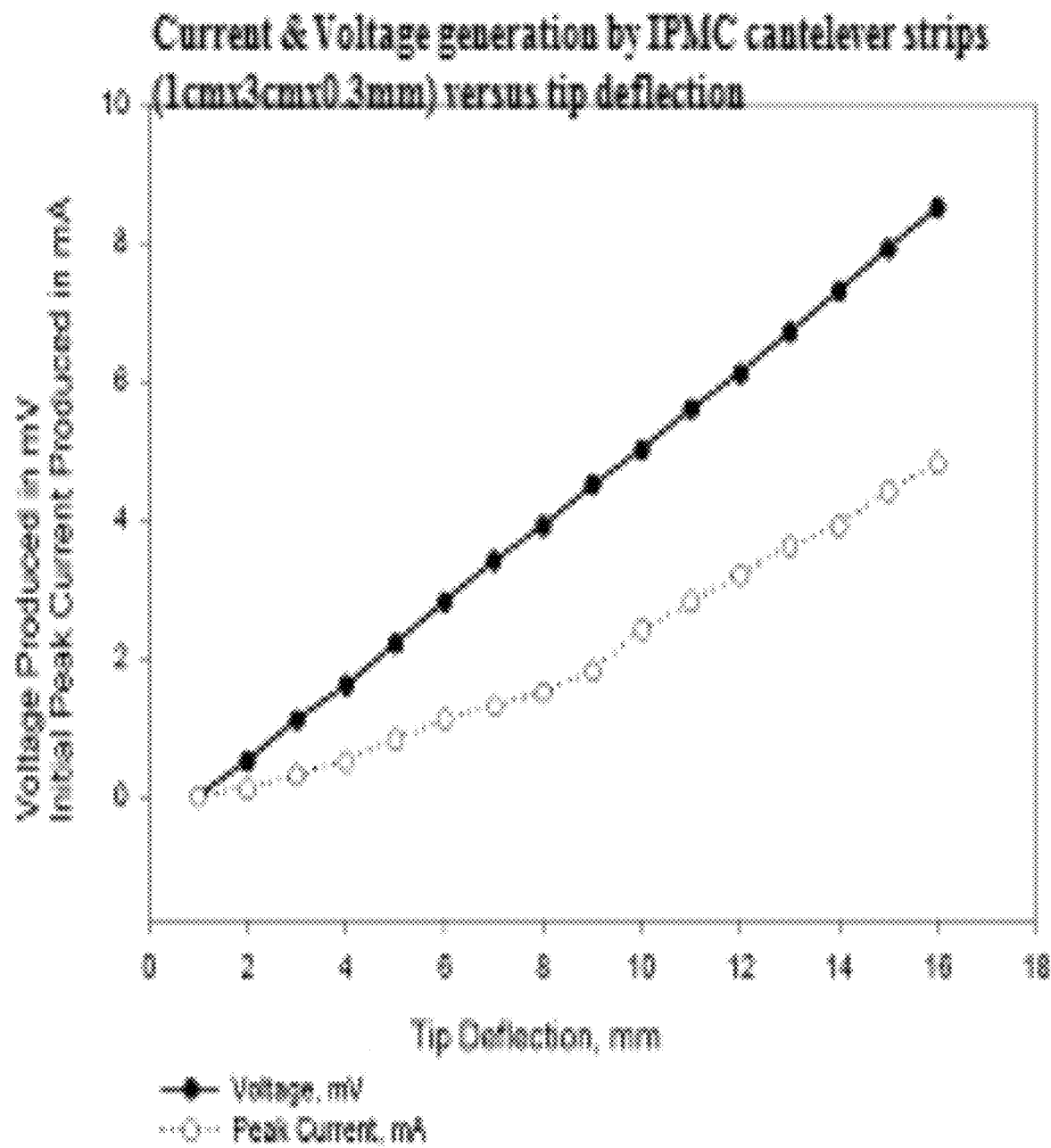
FIG. 1 is an illustration of current and voltage generation by IPMC cantilever strips versus tip deflection.
Figure 2:
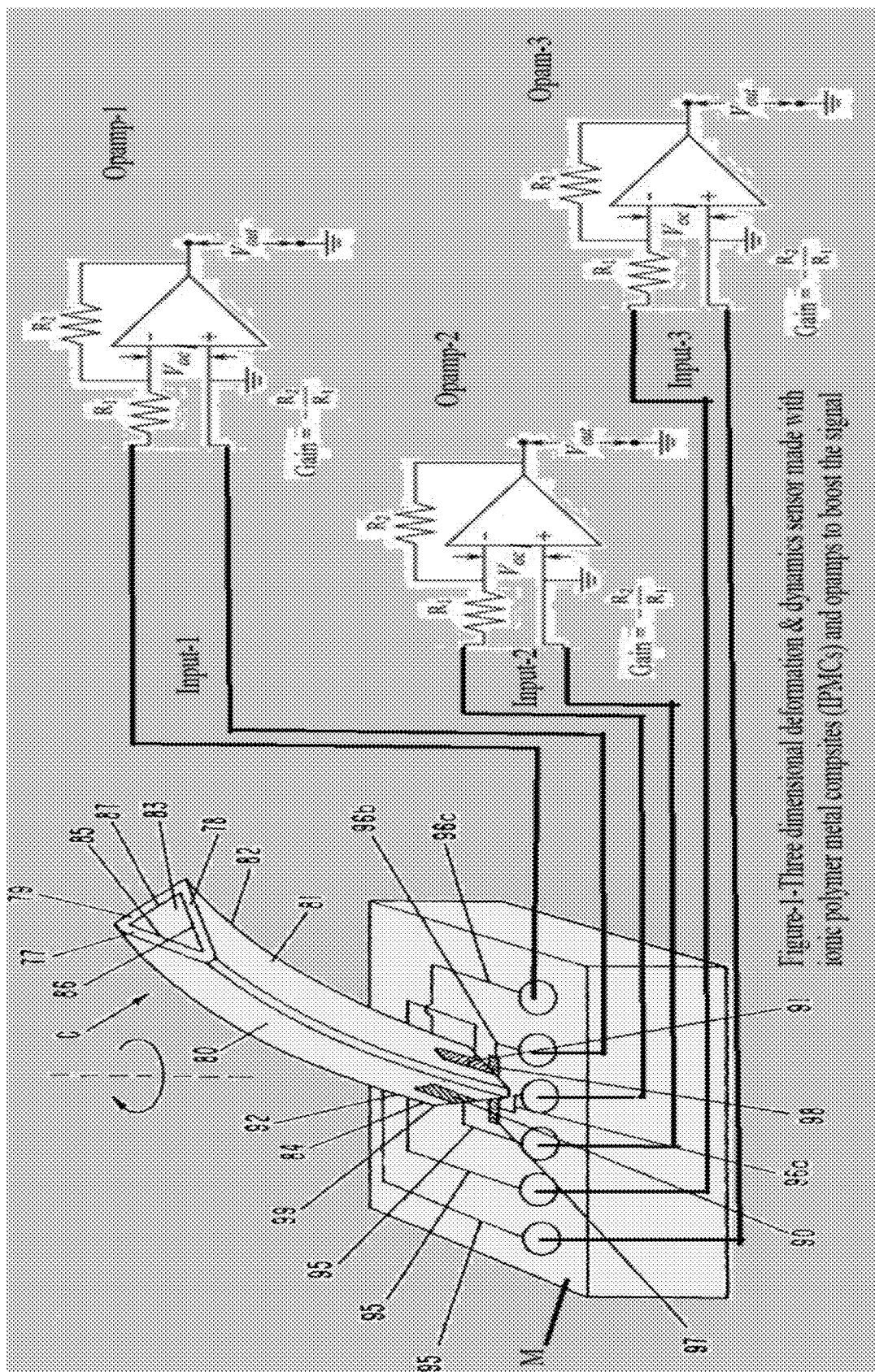
FIG. 2 is a schematic view of an example embodiment of a three-dimensional undulating IPMC deformation and dynamic sensor with a triangular cross-section, showing a perspective view of a three-dimensional membrane actuator C packaged in three-dimensional form for use with a three-phase generator box M.
Figure 4:
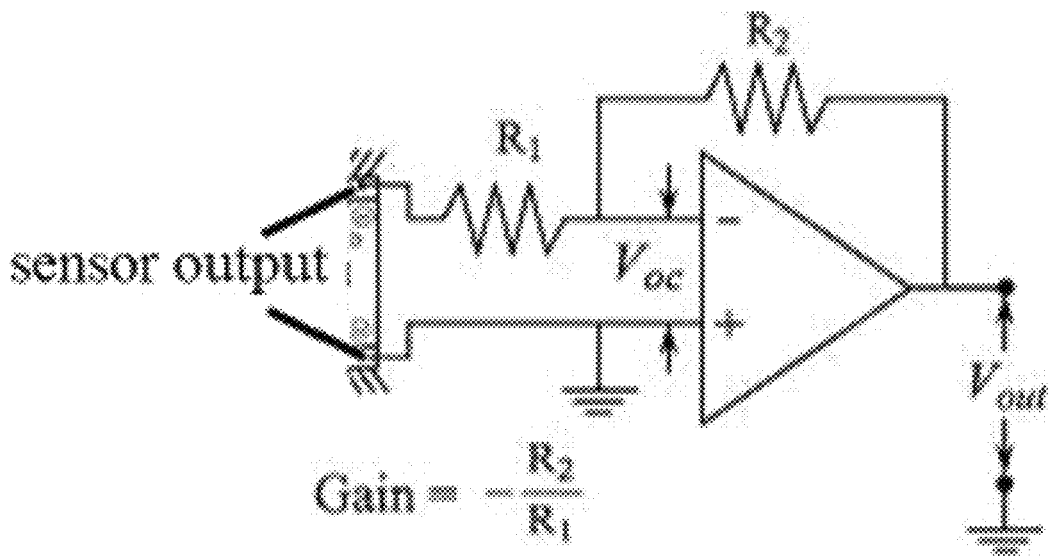
FIG. 4 is a schematic illustration of an electronic arrangement in an operation amplifier to boost an output sensing signal.

FIG. 4 is a schematic view of an example embodiment of a three-dimensional undulating IPMC deformation and dynamic sensor with a triangular cross-section. FIG. 2 shows a three-dimensional membrane actuator C packaged in three-dimensional form for use with a three-phase generator box M. Actuator C comprises a hollow triangular tube configuration consisting of three independent membrane actuators 77 (shown), 78 (shown) and 79 (partially visible in the figure) attached and electrically insulated along the long edges with three external faces 80 (shown), 81 (shown) and 82 (not visible in the figure), respectively and a first end 83 (free) and second end 84 which is fixed to the generator box M. External terminals 90 (shown), 91 (shown), and 92 (not visible in the figure) are disposed at the second end 84 of actuator C for connection to electrodes 95a (shown), 95b (shown), 95c (shown), respectively incorporated in generator box M. Internal faces of the actuators 85 (not visible in the figure), 86 (not visible in the figure), and 87 (shown) are connected via internal terminals 97 (partially visible in the figure), 98 (partially visible in the figure) and 99 (not shown) to electrodes 96a (shown), 96b (shown)and 96c (shown) of the generator box M, respectively. Membrane actuator C is fabricated to produce a 3-dimensional movement by positioning each of actuators 77, 78, and 79 to be stimulated at a phase angle apart from the adjacent actuator by a low amplitude alternating signal. The triangular cross-section with three pairs of bending sensors allows the column to undulate as a three dimensional deformation and dynamics sensor.

In FIG. 2, the three actuators 77, 78, and 79 are joined together by a flexible adhesive (such as LOCTITE SUPERFLEX, trademarks of their owners) at the edges, forming seams. Each actuator has its own terminal connections to each three phases of a typical 3-phase power generator (M) or a multi-phase power supply. Programmable function generators/power supplies exist that have phase-separated outputs. Operational amplifiers are attached to the three pairs of electrodes to boost the sensing signal for measurements. Each of these actuators has its external and internal faces similar to the top and bottom faces of the tweezer shown in FIG. 6. The final actuator, then, looks like a triangular hollow tube fixed at one end to a platform and free at the other end to wobble or rotate around an imaginary vertical axis. Each output pair of the 1-phase generator is connected to an input terminal pair of each actuator. Each actuator has a pair of terminals (one on the inside and one on the outside of the actuator). FIG. 2 illustrates this arrangement.

Figure 3:
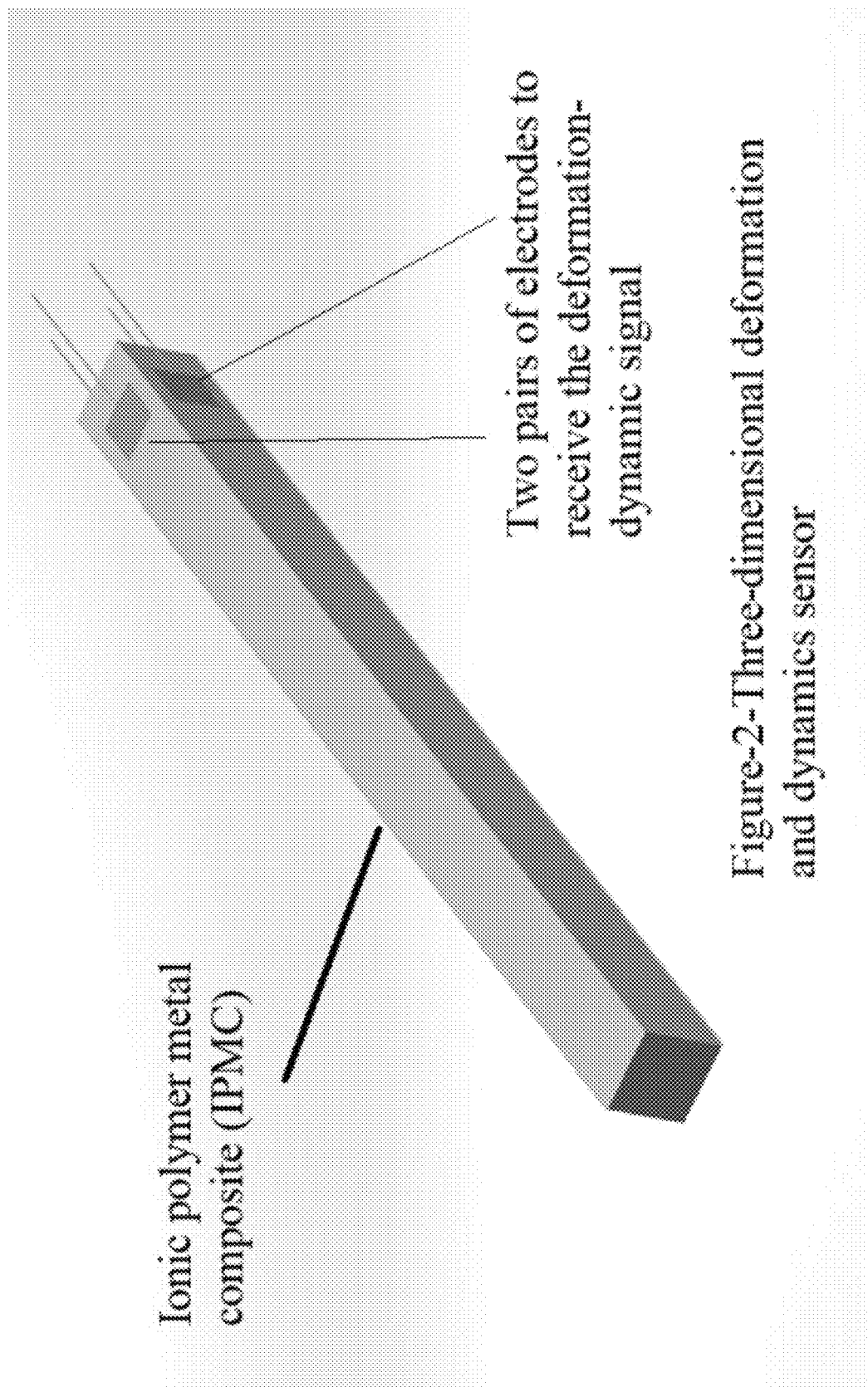
FIG. 3 is a schematic view of an undulating three-dimensional undulating IPMC deformation and dynamic sensor with a square cross-section and two pairs of golden electrodes.

FIG. 3 is a schematic view of an undulating three-dimensional undulating ionic polymer metal composite (IPMC) deformation and dynamic sensor with a square cross-section and two pairs of golden electrodes, suitable for use with the operation amplifier circuit of FIG. 4. In this manner the deformation of the square cross-section in an undulating manner creates two pairs of signals that can be boosted by operation amplifiers. The functioning material works based on ionic migration as described in connection with FIG. 7. Movement of the sensor causes cations to relocate and thus generate a current and a voltage.

FIG. 4 is a schematic illustration of an electronic arrangement in an operation amplifier to boost an output sensing signal, showing the gain −R2/R1. Outputs of a sensor are connected as shown in the figure. A first sensor output is connected through resistor R1 to a first input of the operational amplifier. A second sensor output is connected to a reference (e.g., ground) and to a second input of the operational amplifier. A feedback resistor R2 is connected between the output and the first input of the operational amplifier. The output of the operational amplifier is determined relative to the reference (e.g., ground).

Figure 5:
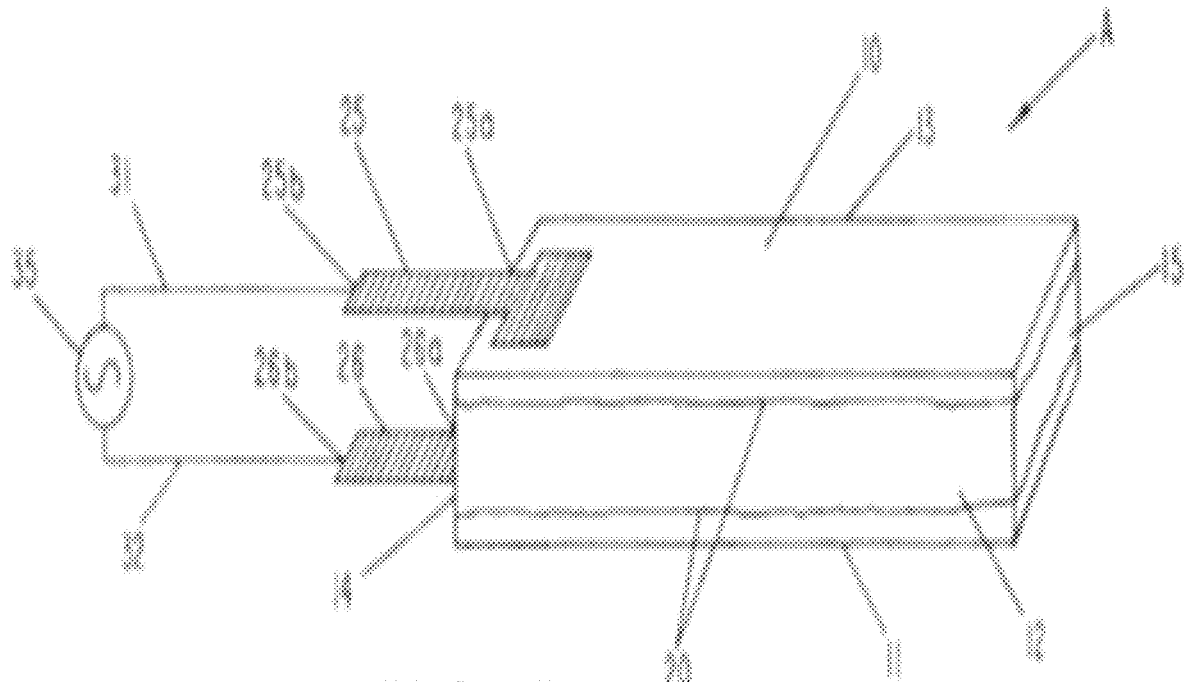
FIG. 5 is a schematic illustration of a IPMC deformation and dynamic motion sensor equipped with one op amp.

FIG. 5 is a schematic illustration of a IPMC deformation and dynamic motion sensor configured to interface with one op amp.

Figure 6:
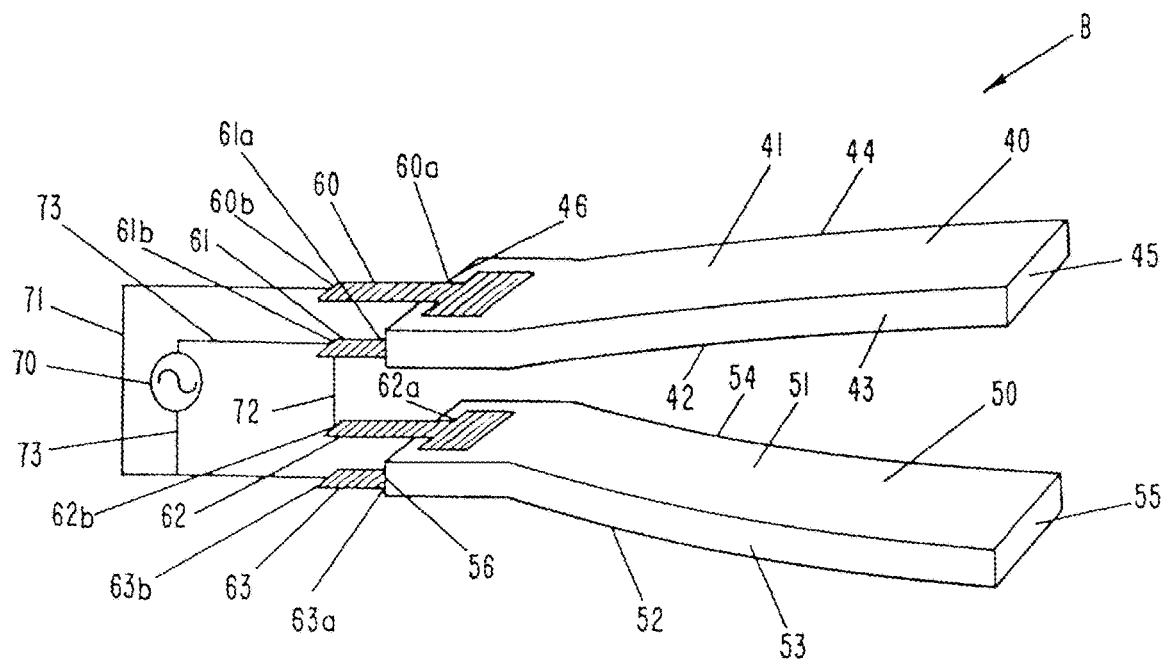
FIG. 6 is a schematic illustration of a IPMC parallel jaw gripper equipped with two op amps.

FIG. 6 is a schematic illustration of a IPMC parallel jaw gripper (or tweezer) configured to interface with two op amps. Note that on this case the actuation and sensing are opposite to each other and thus the gripper tends to grab objects.

Embodiments of the present invention provide a soft activation device that resembles biological muscles. The limitations associated with existing actuators and the methods for their manufacture are overcome by the present invention which provides a method of preparing actuators (synthetic muscles) comprising the steps of: rinsing an ion-exchange material; coating the ion-exchange material with a substance which undergoes chemical reduction in the presence of a reducing agent; and reducing the coating on the ion-exchange material by exposing the ion-exchange material to a reducing agent.

In an example embodiment, the ion-exchange material comprises a material selected from the group consisting of ion-exchange membranes, ionomer membranes, ion-exchange resins, gels, beads, powders, filaments, and fibers, an ion-exchange membrane, as an example a polymer ion-exchange membrane, and as another example a perfluorinated sulfonic acid ion-exchange polymer membrane.

Rinsing can be performed in water. The ion-exchange material can have at least two surfaces and rinsing is preceded by roughening the surfaces of the ion-exchange material, such as by sand-blasting with fine glass bead sandblast. Rinsing can also be preceded by cleaning the ion-exchange material in an ultrasonic water bath cleaner. The cleaning includes heating (e.g., boiling) the ion-exchange material in solution (preferably acidic, e.g., HCl). The ion-exchange material can have at least two surfaces and rinsing comprises (in order): roughening the surfaces of the ion-exchange material; cleaning the ion-exchange material; rinsing the ion-exchange material in water; and boiling the ion-exchange material in an aqueous solution (e.g., acidic, such as an HCl solution). Rinsing can comprise at least two steps of rinsing and boiling the ion-exchange material in solution (in water, for a sufficient time to completely swell the ion-exchange material).

Coating can be done with a metal, e.g., a noble metal, e.g., platinum, and is performed for a time sufficient to cover the ion-exchange material with a coating of approximately 3.75 mg/cm2 of the coating substance. Coating can comprise: immersing the ion-exchange material; and stirring. Immersing can be, and in some embodiments is preferably, done into a solution containing a salt of a metal, such as a noble metal, palladium, or nickel, e.g., a platinum salt, e.g., a platinum-amine complex, e.g., Pt(NH3)4Cl2.

The reducing step can comprise, and in some embodiments is best to, exposing the ion-exchange material to NaBH4. Reducing can be done in solution (e.g., aqueous) containing a reducing enhancer like NH4 OH, and involves continuously raising the temperature of the solution to a predetermined temperature. Reducing can be done at an elevated temperature in solution in a water bath at an elevated temperature and includes simultaneously stirring the solution in the water bath, and simultaneously the predetermined temperature and simultaneously adding a final amount of supplementary reducing agent when the predetermined temperature is reached, continuously stirring the solution after adding the final amount of supplementary reducing agent, rinsing the ion-exchange material (in water or HCl solution), and storing the ion-exchange material. The reducing step can comprise at least one reducing step comprising (in order): rinsing the ion-exchange material; immersing the ion-exchange material in a solution containing a reducing agent; rinsing the ion-exchange material and storing the ion-exchange material. The immersing is in a solution (aqueous) containing a salt of a metal such as a noble metal, palladium, or nickel, e.g., a platinum salt, e.g., a platinum-amine complex, e.g., Pt(NH3)4Cl2, as well as a reducing enhancer such as NH4 OH, as well as a reducing agent such as H2NOH•HC1 or H2NNH2•H20. Reducing can comprise simultaneously: continuously raising the temperature of the solution and stirring the solution (at low speed) while adding the reducing agent. Reducing can comprise simultaneously: continuously raising the temperature of the solution to a predetermined temperature; and adding supplementary reducing agent at regular intervals for a time sufficient to substantially complete reduction, as well as testing the solution for completion of reduction such as by monitoring a color change produced by reduction.

Rinsing can involve at least two rinsing steps, the first in water or an acidic (HCl) solution, or both in sequence, and is performed for a time sufficient to exchange cations in the ion-exchange material for H+ cations outside the ion-exchange material. The second is in water or a basic (NaOH) solution, or both in sequence, and is performed for a time sufficient to exchange cations in the ion-exchange material, such as H+ cations in the ion-exchange material are exchanged for alkali metal (Na+) cations outside the ion-exchange material. A second of the at least one reducing and the rinsing are repeated, followed by a final rinsing step in water. After the two rinsing steps, the ion-exchange material is can be cleaned ultrasonically. Storing is preferably done in water.

Figure 7:
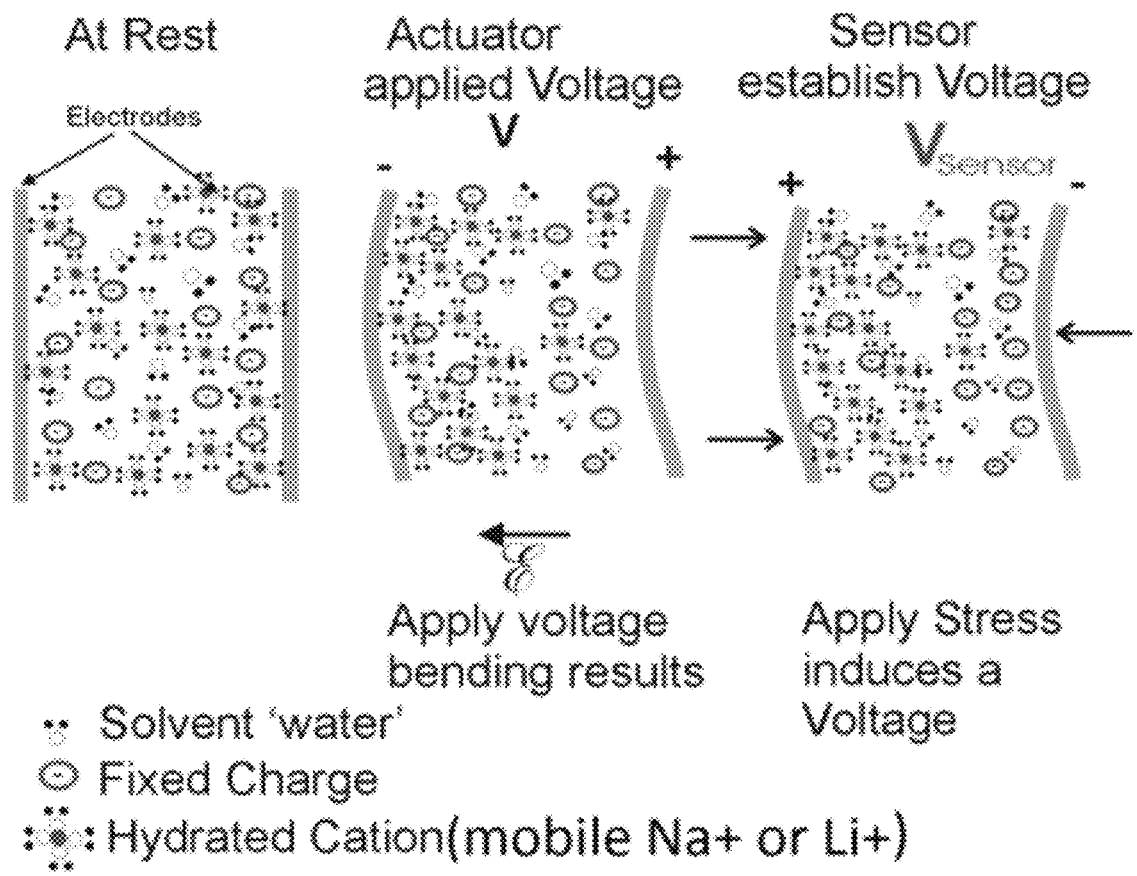
FIG. 7 is a schematic illustration of mechanisms of actuation and sensing in IPMCs.

FIG. 7 illustrates the actuation and sensing mechanism due to migration of cations towards the cathode electrodes causing bending in the anode direction. IPMCs, as shown in FIG. 7, undergo similar cation migrations and rearrangements when subjected to either an electric field or a deformation field. Small samples of IPMC cantilevered strips (0.5 cm×3 cm×0.2 mm) are capable of generating a tip blocking force density of 40. This capability means they can lift an object 40 times their weight. For example, if the weight of an IPMC strip with a density 2 gm/cm3 is 0.1 gmf, then it can produce a tip blocking force of about 4 gmf. Several water molecules tend to attach or bond with cations. This number is called the hydration number, 4 for Na+ and 6 for Li+. Poisson-Nernst-Planck phenomena govern such ion dynamics.

The invention provides a new configuration of an ionic polymer metal composite (IPMC) three-dimensional deformation and dynamics sensor capable of sensing any complex deformation, twisting rolling and acceleration measurements by using plated electrodes. Embodiments of the invention provide a geometric configuration of an ionic polymer metal composite (IPMC) three dimensional deformation and dynamics sensor capable of sensing any complex deformation, twisting rolling and acceleration measurements by using plated electrodes.

Embodiments of the present invention provide configurations of an ionic polymer metal composite (IPMC) three dimensional deformation and dynamics sensor capable of sensing any complex deformation, twisting rolling and acceleration measurements by using plated electrodes and connecting the output sensing signal to operational amplifiers to boost the output signal in voltage for better measurement of output signal. Embodiments of the invention provide ion exchange membrane-based sensors, actuators and sensor/actuators and methods of making same for applications requiring sensing, actuating and controlling displacement. Sensors, actuators, and sensor/actuators are useful in biological as well as other applications. Encapsulation of the sensors, actuators, or sensor/actuators further increases the utility of the present invention. Some device embodiments made using lithium are preferred over those made using only sodium.

References that can facilitate understanding of the present invention include the following, each of which is incorporated herein by reference:

. G. de Gennes (Nobel Laureate, 1991 in Physics), K. Okumura, M. Shahinpoor, and K. J. Kim, "Mechanoelectric Effects in Ionic Gels," Europhysics Letters, Vol. 50, No. 4, pp. 513-518, (2000)

Mohsen Shahinpoor, "Recent Advances in Ionic Polymer Metal Nanocomposites As Distributed Biomimetic Nanosensors, Nanoactuators and Artificial Muscles," J. of Physics CS, Institute of Physics, Journal of Physics: Conference Series 127 pp. 20-28, (2008-2009)

M. Shahinpoor, "Ionic Polymer Metal Composites (IPMCs): Smart Multi-Functional Materials and Artificial Muscles," Volume I, Royal Society of Chemistry Publishers, Dr. Cara Sutton, MRSC, Commissioning Editor, Thomas Graham House, Science Park, Milton Road, Cambridge CB4 0WF, UK M. Shahinpoor, "Ionic Polymer Metal Composites (IPMCs): Smart Multi-Functional Materials and Artificial Muscles," Volume II, Royal Society of Chemistry Publishers, Dr. Cara Sutton, MRSC, Commissioning Editor, Thomas Graham House, Science Park, Milton Road, Cambridge CB4 0WF, UK (2016)

Shahinpoor, M. and Mojarrad, M, Soft Actuators and Artificial Muscles, U.S. Pat. No. 6,109,852, Shahinpoor, M. and Mojarrad, M., "Ionic Polymer Sensors and Actuators", U.S. Pat. No. 6,475,639, Issued Nov. 5, 2002.

D. Chatterjee, N. Hanumaiah, Y. Bahramzadeh and M. Shahinpoor, "Actuation and Sensing Studies of a Miniaturized Five Fingered Robotic Hand Made with Ion Polymeric Metal Composite (IPMC)", Advanced Materials Research, Vol. 740 (2013) pp.: 492-495, Trans Tech Publications, Switzerland, (2013)

Y. Bahramzadeh and M. Shahinpoor, "Dynamic Curvature Sensing Based On Ionic Polymer-Metal Composite (IPMC) Sensors", Smart Materials and Structures Journal, vol. 20, no. 9, 094011 (7 pp), Sep. (2011)

Mohsen Shahinpoor, "Ionic Polymeric Conductor Nano Composites (IPCMCs) As Distributed Nanosensors, Nanoactuators and Artificial Muscles", Journal of Bioinspiration and Biomimetics, Institute of Physics, Bioinsp. Biomim. 3 (2008) 035003 (8 pp) (2008-2009).

Mohsen Shahinpoor, "Recent Advances in Ionic Polymer Metal Nanocomposites As Distributed Biomimetic Nanosensors, Nanoactuators and Artificial Muscles", J. of Physics CS, Institute of Physics, Journal of Physics: Conference Series 127 pp. 20-28, (2008-2009)

Mohsen Shahinpoor, "Ionic Polymeric Conductor Nano Composites (IPCMCs) As Distributed Nanosensors and Nanoactuators", Advances in Science and Technology J., Vol. 54, pp. 70-81, Trans Tech Publication, Switzerland, (2008)

M. Shahinpoor,"Smart Ionic Polymer Conductor Composite Materials as Multifunctional Distributed Nanosensors, Nanoactuators and Artificial Muscles", American Society of Mechanical Engineers, Materials Division (Publication) MD 100 MD, pp. 485-489, (2005)

M. Shahinpoor and K. J. Kim, "Ionic Polymer-Metal Composites—III. Modeling and Simulation As Biomimetic Sensors, Actuators, Transducers and Artificial Muscles" (Review Paper), Smart Materials and Structures Int. J., vol 13, No. 4, pp. 1362-1388, (2004)

M. Shahinpoor and A. Guran, "Ionic Polymer-Conductor Composites (IPCC) as Biomimetric Sensors, Actuators and Artificial Muscles, Selected Topics in Structures and Mechatronics Systems", Editors: A. Belyaev and A. Guran, pp. 417-436, World Scientific Publishers, London, (2003)

M. Shahinpoor, "Ionic Polymer-Conductor Composites As Biomimetic Sensors, Robotic Actuators and Artificial Muscles-A Review", Electrochimica Acta, Vol. 48, No. 14-16, pp. 2343-2353, (2003)

K. J. Kim and M. Shahinpoor, "Application of Polyelectrolytes in Ionic Polymeric Sensors, Actuators, and Artificial Muscles", Review Chapter in Handbook of Polyelectrolytes and their Applications, edited by S. K. Tripathy, J. Kumar and H. S. Nalwa, vol. 3; Applications of Polyelectrolytes and Theoretical Models, American Scientific Publishers, Stevenson Ranch, Calif., U.S.A. (2002)

K. J. Kim and M. Shahinpoor, "A Novel Method of Manufacturing Three-Dimensional Ionic Polymer-Metal Composites (IPMC's) Biomimetic Sensors, Actuators and Artificial Muscle,", Polymer, Vol. 43/3, pp. 797-802 (2002)

M. Shahinpoor and K. J. Kim, "Novel Ionic Polymer-Metal Composites Equipped with Physically-Loaded Particulate Electrode As Biomimetic Sensors, Actuators and Artificial Muscles," Actuators and Sensors A, Physical, 96 (2/3) A, 3163, pp. 125-132, (2002)

M. Shahinpoor, "Ion-Exchange Membrane-Metal Composite As Biomimetic Sensors and Actuators, " Book Chapter, Chapter 12, in Polymer Sensors and Actuators, Edited by Y. Osada and D. De Rossi, Springer-Verlag-Heidelberg, pp. 325-359, (2000)

M. Shahinpoor, "Ionic Polymer Metal Composite As Biomimetic Sensors and Actuators,", in Volume 44, Book No. 2 of Evolving and Revolutionary Technologies for the New Millennium, Edited by Leslie J. Cohen, Jerome L. Bauer and William E. Davis Published by SAMPE, pp. 1950-1960, Covina, Calif., U.S.A. (1999)

M. Shahinpoor, Y. Bar-Cohen, J. Simpson and J. Smith, " Ionic Polymer-Metal Composites (IPMC's) As Biomimetic Sensors and Actuators,", Book Chapter 3, in Field-Responsive Polymers, American Chemical Society Publication, ACS-FRP, ACS Symposium Series 726, Edited by I.M. Khan and J. S. Harrison, Oxford University Press, pp. 25-50, (1999)

M. Shahinpoor, Y. Bar-Cohen, J. Simpson and J. Smith, " Ionic Polymer-Metal Composites (IPMCs) As Biomimetic Sensors, Actuators and Artificial Muscles-A Review", Smart Materials & Structures Int. Journal, vol. 7, pp. R15-R30, (1998)

Y. Bahramzadeh and M. Shahinpoor, "Ionic Polymer-Metal Composites (IPMCs) as Dexterous Manipulators and Tactile Sensors for Minimally Invasive Robotic Surgery", Proceeding of SPIE 19th Annual International Symposium on Smart Structures and Materials, 11-15 Mar., 2012, Town & Country Resort and Convention Center, San Diego, Calif., (2012)

Mohsen Shahinpoor, "Ionic Polymer Conductor Nano-Composite Materials (IPCNC) Also known As IPMCs: As Distributed Nanosensors, Nanoactuators, Nanotransducers and Artificial Muscles", Proceedings of 4th. Joint European Society of Artificial Organs (ESAO) and International federation for Artificial Organs (IPAO) Congress 2011, Oct. 9-12, 2011, Porto Congress Center, Portugal, (2011)

Y. Bahramzadeh and M. Shahinpoor, "Charge Modeling of Ionic Polymer-Metal Composites for Dynamic Curvature Sensing", Proceeding of SPIE 18th Annual International Symposium on Smart Structures and Materials, 6-10 Mar., 2011, San Diego, Calif., (2011)

Y. Bahramzadeh and M. Shahinpoor, "Characterizing of Ionic Polymer Metal Composites (IPMCs) for Sensitive Curvature Measurement", Article No. SMASIS2010-3799, Proceedings of the ASME 2010 Conference on Smart Materials, Adaptive Structures and Intelligent Systems, SMASIS2010 Sep. 28-Oct. 1, 2010, Philadelphia, Pa., U.S.A.

Mohsen Shahinpoor, "Micro-catheter equipped with a biomimetic soft robotic polymeric artificial muscle distal tip bender, actuator and sensor for neurological endovascular surgery", Proceedings of the 22nd. International Congress on Computer-Assisted Radiology and Surgery (CARS 2008), Barcelona, Spain, Jun. 23-28, (2008)

Mohsen Shahinpoor, "Ionic Polymeric Conductor Nano Composites (IPCMCs) As Distributed Nanosensors and Nanoactuators", Proceedings of the 3rd. International Congress on Smart materials, Structures and Systems (CIMTEC 2008), Acireale, Sicily, Italy, Jun. 8-13, (2008)

Ron Lumia and Mohsen Shahinpoor, "IPMC Microgripper Research and Development", Proceedings of the 4th. International Congress on Biomimetics, Artificial Muscles and Nano-Bio 2007, Cartagena, Spain, Europe, Nov. 6-8, (2007)

M. Shahinpoor, "Recent Advances in Ionic Polymer Metal Nanocomposites As Distributed Biomimetic Nanosensors, Nanoactuators and Artificial Muscles", Proceedings of the 4th. International Congress on Biomimetics, Artificial Muscles and Nano-Bio 2007, Cartagena, Spain, Europe, Nov. 6-8, (2007)

Mohsen Shahinpoor,"Ionic Polymer Conductor Nano-Composites As Distributed Nanosensors, Nanoactuators And Artificial Muscles-A review", Mater. Res. Soc. Sympo. Proc., Vol. 949, No. 0949-C07-01, (2007)

M. Shahinpoor, "Ionic Polymer Metal Composites As Distributed Nanosensors Nanoactuators and Artificial Muscles-A Review", Proceedings of the Third World Congress On Biomimetics, Artificial Muscle and Nano-Bio (Biomimetics and Nano-Bio 2006), May 25-28, 2006 Lausanne, Switzerland, (2006)

M. Shahinpoor, "Smart ionic Polymer Conductor Composite Materials As multifunctional distributed nanosensors, nanoactuators and artificial muscles", IMECE2005-79394, Proceedings of ASME-IMECE 2005, ASME International Mechanical Engineering Congress and RD&D Exposition, Nov. 5-11, 2005, Orlando/Orange County Convention & Visitors Bureau, Orlando, Fla. (2005)

M. Shahinpoor "Recent Advances In Ionic Polymer Conductor Composite Materials As Distributed Nanosensors, Nanoactuators And Artificial Muscles", Proceeding of SPIE 12th Annual International Symposium on Smart Structures and Materials, 7-10 Mar., 2005, San Diego, Calif., SPIE Publication No. 5759, pp. 49-63, (2005)

M. Shahinpoor, "Ionic Polymer Conductor Composite Materials as Distributed Nanosensors, Nanoactuators and Artificial Muscles—A Review", Proceedings of the Second World Congress On Biomimetics and Artificial Muscle (Biomimetics and Nano-Bio 2004), Dec. 5-8, 2004, Albuquerque Convention Center, Albuquerque, N. Mex., U.S.A., (2004)

M. Shahinpoor, "Ionic Polymer Conductor Composites As Distributed Nanosensors, Nanoactuators and Artificial Muscles-A Review of Recent Findings", Proceeding of The International Conference on Advanced Materials and Nanotechnology, AMN-1, The MacDiarmid Institute for Advanced Materials and Nanotechnology, 9-11 Feb. 2003, Wellington, New Zealand, pp. 14-22, (2003)

M. Shahinpoor, M. Ahghar, K. J. Kim and L. O. Sillerud, "Industrial and Medical Applications of Ionic Polymer-Metal Composites as Biomimetic Sensors, Actuators, and Artificial Muscles,", Proceeding of SPIE 9th Annual International Symposium on Smart Structures and Materials, San Diego, Calif., SPIE Publication No. 4695-43, (Mar., 2002)

M. Shahinpoor, "Ionic polymer-Conductor composites (IPCC's) as Biomimetic Robotic Actuators, Sensors and Artificial Muscles,", Proc. 8th. Int. Conf. On New Actuators, Actuators 2002, Jun. 10-12, 2002, Bremen, Germany M. Shahinpoor, "Fundamentals of Ionic Polymer Conductor Composites as Biomimetic Sensors, Soft Actuators and Artificial Muscles-A Review of Recent Findings,", Keynote Presentation, Soft Actuators and Sensors, Proc. Of 14th. U.S. National Congress on Theoretical and Applied Mechanics, Virginia Tech., Jun. 23-28, 2002

B. K. Henderson, S. Lane, M. Shahinpoor, K. J. Kim, and D. Leo, "Evaluation of Ionic Polymer-Metal Composites (IPMC) for Use as Near DC Mechanical Sensors," Proceeding of AIAA Space 2001 Conference and Exposition, Albuquerque, N. Mex., AIAA 2001-4600 (Aug., 2001)

M. Shahinpoor and K. J. Kim, "Nano and Micro Sensors, Actuators and Artificial Muscles Made with Ionic Polymeric Conductive Composites,", Proceeding of NanoSpace 2001, International Conference, Exploring Interdisciplinary Frontiers In Integrated Nano/Microtechnology for Space and Biomedical applications, Mar. 13-16, Houston Moody Gardens, (2001)

M. Shahinpoor, K. J. Kim, S. Griffin, and D. Leo, "Sensing Capabilities of Ionic Polymer-Metal Composites", Proceeding of SPIE 8th Annual International Symposium on Smart Structures and Materials, Newport Beach, Calif., Vol. 4329-(28), Mar., (2001)

M. Shahinpoor, "Potential Applications of Electroactive Polymer Sensors and Actuators in MEMS Technologies,", Proceedings of SPIE's 2000 Symposium on Smart Materials & MEMS, Dec. 13-15, Melbourne, Australia, SPIE Publication No. 4234-40, pp. 450-459, (2000)

K. J. Kim, M. Shahinpoor, and A. Razani, "Preparation of IPMCs for Use in Fuel Cells, Electrolysis, and Hydrogen Sensors", Proceedings of SPIE 7th International Symposium on Smart Structures and Materials, Newport Beach, Calif., 3687, pp. 311-320 (Mar., 2000)

A. Keshavarzi, M. Shahinpoor, K. J. Kim, and J. Lantz, "Blood Pressure, Pulse Rate, and Rhythm Measurement Using Ionic Polymer-Metal Composites Sensors", Proc.

SPIE Smart Materials and Structures Conference, Mar. 1-5, 1999, New Port Beach, Calif., Publication No. SPIE 3669-36, pp. 369-376, (1999)

M. Shahinpoor, "Ionic Polymer Metal Composite As Biomimetic Sensors and Actuators", Proc. 44th. Int. SAMPE Symposium, Edited by: Dr. Leslie J. Cohen, Jerome, L. Bauer and William E. Davis, Published by SAMPE, pp. 1950-1960, May 23-27, Long Beach, Calif., (1999)

K. Salehpoor, M. Shahinpoor, and A. Razani, "Role of Ion Transport In Dynamic Sensing and Actuation of Ionic Polymeric Platinum Composite Artificial Muscles", Proc. SPIE Smart Materials and Structures Conference, Mar. 3-5, 1998, San Diego, Calif., Publication No. SPIE 3330-09, (1998)

M. Shahinpoor, Y. Bar-Cohen, T. Xue, J. O. Simpson, and J. Smith, "Ionic Polymer-Metal Composites (IPMC) as Biomimetic Sensors and Actuators", Proceedings of SPIE's 5th Annual International Symposium on Smart Structures and Materials, 1-5 Mar., 1998, San Diego, Calif.. Paper No. 3324-27, (1998)

M. Shahinpoor and M. Mojarrad,"Ion-Exchange-Metal Composite Sensor Films", Proceedings of 1997 SPIE Smart Materials and Structures Conference, vol. 3042-10, San Diego, Calif., Mar. (1997)

Shahinpoor, M., "Ion-Exchange Polymer-Metal Composites as Biomimetic Sensors and Actuators: Artificial Muscles", Proc., Los Alamos National Laboratories, Workshop on Self-Assembling and Biomimetic Materials, Dec. 15-17, (1997), Los Alamos, N. Mex. (1997)

M. Shahinpoor, "The Ionic Flexogelectric Effect", Proc. 1996, SPIE 2779, Third International Conference on Intelligent Materials, ICIM'96, and Third European Conference on Smart Structures and Materials, edited by: Pierre F. Gobin; Jacques Tatibouet, pp. 1006-1011, Jun. 1996, Lyon, France, (1996)

M. Shahinpoor, "A New Effect in Ionic Polymeric Gels: The Ionic "Flexogelectric Effect"", Proc. SPIE 1995 North American Conference on Smart Structures and Materials, Feb. 28-Mar. 2, 1995, San Diego, Calif., vol. 2441, paper no. 05, pp. 42-53, (1995)

Mehran Mojarrad,"Study of Ionic Polymeric Gels As Smart Materials and Artificial Muscles for Biomimetic Swimming Robotic Applications", Department of Mechanical Engineering, University of New Mexico, Albuquerque, N. Mex., Ph.D., Dec., (2001)

M. Shahinpoor, K.J. Kim and M. Mojarrad, "Artificial Muscles: Applications of Advanced Polymeric Nano Composites", CRC Press, Taylor & Francis Group, London SW15 2NU, Great Britain, 1st. edition, (2007)

M. Shahinpoor and M. Mojarrad,"Ion-Exchange-Metal Composite Sensor Films", Proceedings of 1997 SPIE Smart Materials and Structures Conference, vol. 3042-10, San Diego, Calif., Mar. (1997)

M. Shahinpoor,"Soft Plastic Robots and Artificial Muscles," International Journal of Advanced Robotic Systems 2 (2), pp. 161-174, (2005)

M. Shahinpoor,"Smart Ionic Polymer Conductor Composite Materials as Multifunctional Distributed Nanosensors, Nanoactuators, and Artificial Muscles," American Society of Mechanical Engineers, Materials Division (Publication) MD 100 MD, pp. 485-489, (2005)

M. Shahinpoor and K. J. Kim, "Ionic Polymer-Metal Composites—IV. Industrial and Medical Applications" (Review Paper), Smart Materials and Structures Int. J., Smart Mater. Struct. Vol. 14, No. 1, pp. 197-214, (2004).

M. Shahinpoor and K. J. Kim, "Ionic Polymer-Metal Composites—III. Modeling and Simulation as Biomimetic Sensors, Actuators, Transducers, and Artificial Muscles" (Review Paper), Smart Materials, and Structures Int. J., vol 13, No. 4, pp. 1362-1388, (2004)

M. Shahinpoor, "Artificial Muscles," Chapter in Encyclopedia of Biomaterials and Biomedical Engineering, edited by G. Wnek and G. Bowlin, Marcel Dekker Publishers, pp. 43-52, New York, N.Y., (2004)

M. Shahinpoor, "Electroactive Ion Containing Polymers," Chapter in Hand Book of Smart Systems, Institute of Physics (IOP) Publication, London, England, (2004)

M. Shahinpoor, "Ionic Polymer-Conductor Composites As Biomimetic Sensors, Robotic Actuators and Artificial Muscles-A Review," Electrochimica Acta, Vol. 48, No. 14-16, pp. 2343-2353, (2003)

M. Shahinpoor, K. J. Kim, and D. Leo, "Ionic Polymer-Metal Composites as Multifunctional Materials," Polymer Composites, Volume 24, No. 1, pp. 24-33, (2003)

M. Shahinpoor, "Mechanoelectrical Phenomena in Ionic Polymers," Journal of Mathematics and Mechanics of Solids, Special issue in honor of Professor Millard F. Beatty, vol. 8, No. 3, pp. 181-188, Jun. (2003)

M. Shahinpoor and K. J. Kim, "Mass Transfer Induced Hydraulic Actuation in Ionic Polymer-Metal Composites," Journal of Intelligent Materials Systems and Structures (JIMSS), Vol. 13, No. 6, pp. 369

K. J. Kim and M. Shahinpoor, "A Novel Method of Manufacturing Three-Dimensional Ionic Polymer-Metal Composites (IPMC's) Biomimetic Sensors, Actuators and Artificial Muscle," Polymer, Vol. 43/3, pp.797-802 (2002)

M. Shahinpoor and K. J. Kim, "Novel Ionic Polymer-Metal Composites Equipped with Physically-Loaded Particulate Electrode as Biomimetic Sensors, Actuators and Artificial Muscles," Actuators and Sensors A, Physical, 96 (2/3) A, 3163, pp. 125-132, (2002)

M. Shahinpoor and K. J. Kim, "Ionic Polymer-Metal Composites — I. Fundamentals," (Review Paper), Smart Materials and Structures Int. J., Vol. 10, No. 4, pp. 819-833 (2001)

M. Shahinpoor, "Ion-Exchange Membrane-Metal Composite As Biomimetic Sensors and Actuators," Book Chapter, Chapter 12, in Polymer Sensors and Actuators, Edited by Y. Osada and D. De Rossi, Springer-Verlag-Heidelberg, pp. 325-359, (2000)

M. Shahinpoor and K. J. Kim, "The Effect of Surface-Electrode Resistance on the Performance of Ionic Polymer-Metal Composite (IPMC) Artificial Muscles," Smart Materials and Structures Int. J., Vol. 9, No. 4, pp. 543-551, (2000)

P. G. de Gennes (Nobel Laureate, 1991 in Physics), K. Okumura, M. Shahinpoor, and K. J. Kim, "Mechanoelectric Effects in Ionic Gels," Europhysics Letters, Vol. 50, No. 4, pp. 513-518, (2000)

Mohsen Shahinpoor, "Recent Advances in Ionic Polymer Metal Nanocomposites As Distributed Biomimetic Nanosensors, Nanoactuators and Artificial Muscles," J. of Physics CS, Institute of Physics, Journal of Physics: Conference Series 127 pp. 20-28, (2008-2009)

M. Shahinpoor, "Ionic Polymer Metal Composites (IPMCs): Smart Multi-Functional Materials and Artificial Muscles," Volume I, Royal Society of Chemistry Publishers, Dr. Cara Sutton, MRSC, Commissioning Editor, Thomas Graham House, Science Park, Milton Road, Cambridge CB4 0WF, UK (2016)

M. Shahinpoor, "Ionic Polymer Metal Composites (IPMCs): Smart Multi-Functional Materials and Artificial Muscles," Volume H, Royal Society of Chemistry Publishers, Dr. Cara Sutton, MRSC, Commissioning Editor, Thomas Graham House, Science Park, Milton Road, Cambridge CB4 0WF, UK (2016)

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

What is claimed is:

1. A three dimensional deformation and dynamics sensor comprising three strips of ionic polymer metal composite element, with each strip disposed along a corresponding face of a triangular column, with each strip having first and second electrodes in electrical communication with opposite sides of the strip and near a first end of the triangular column, and three operational amplifiers where each operational amplifier has first and second inputs, with the first and second inputs of each operational amplifier in electrical communication with the first and second electrodes of a corresponding strip.

2. The sensor of claim 1, further comprising a three phase power supply having three phases, where each phase of the three phases of the three phase power supply is in electrical communication with the first and second electrodes of a corresponding strip.

\* \* \* \* \*